(12) United States Patent
Itami

(10) Patent No.: US 9,470,999 B2
(45) Date of Patent: *Oct. 18, 2016

(54) OPTICAL DEFLECTOR, OPTICAL SCANNING APPARATUS, AND IMAGE FORMING APPARATUS

(71) Applicant: Ricoh Company, Ltd., Tokyo (JP)

(72) Inventor: Yukio Itami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,236

(22) Filed: Jul. 15, 2015

(65) Prior Publication Data

US 2015/0316871 A1 Nov. 5, 2015

Related U.S. Application Data

(60) Continuation of application No. 14/503,869, filed on Oct. 1, 2014, now Pat. No. 9,116,457, which is a continuation of application No. 14/246,622, filed on Apr. 7, 2014, now Pat. No. 8,896,898, which is a (Continued)

(30) Foreign Application Priority Data

Dec. 26, 2005 (JP) .................................. 2005-372744

(51) Int. Cl.
| | |
|---|---|
| *G02B 26/08* | (2006.01) |
| *G03G 15/04* | (2006.01) |
| *G02B 5/09* | (2006.01) |

(Continued)

(52) U.S. Cl.
CPC ......... *G03G 15/04036* (2013.01); *B41J 2/471* (2013.01); *G02B 5/09* (2013.01); *G02B 26/12* (2013.01); *G02B 26/121* (2013.01); *G02B 26/123* (2013.01); *G03G 15/04* (2013.01)

(58) Field of Classification Search
CPC .. G02B 26/12; G02B 26/121; G02B 26/122; G02B 26/124
USPC .......... 359/198.1, 219.1, 221.2, 221.3, 221.4
See application file for complete search history.

(56) References Cited

U.S. PATENT DOCUMENTS

| | | | |
|---|---|---|---|
| 4,523,800 A | 6/1985 | Yamashita et al. |
| 5,512,949 A | 4/1996 | Fisli et al. |

(Continued)

FOREIGN PATENT DOCUMENTS

| | | |
|---|---|---|
| JP | 7-98437 | 4/1995 |
| JP | 7-30674 | 11/1995 |

(Continued)

OTHER PUBLICATIONS

Japanese Office Action issued in Japanese Patent Application No. 2005-372744 on Mar. 29, 2011.

*Primary Examiner* — Euncha Cherry
(74) *Attorney, Agent, or Firm* — Oblon, McClelland, Maier & Neustadt, L.L.P.

(57) ABSTRACT

An optical deflector including a rotary member supported by a bearing shaft and rotatively driven by a motor for deflecting a plurality of laser beams separated from each other in a rotational axis direction of the rotary member is disclosed. The optical deflector includes a polygon mirror having four sides arranged about the rotational axis direction. Each of the four sides is a continuous plane having a plurality of effective reflection areas separated from each other in the rotational axis direction.

19 Claims, 10 Drawing Sheets

Related U.S. Application Data continuation of application No. 13/790,921, filed on Mar. 8, 2013, now Pat. No. 8,743,445, which is a division of application No. 11/613,445, filed on Dec. 20, 2006, now Pat. No. 8,416,483.

(51) Int. Cl.
  *G02B 26/12*  (2006.01)
  *B41J 2/47*  (2006.01)

(56) References Cited

U.S. PATENT DOCUMENTS

| | | |
|---|---|---|
| 5,663,827 A | 9/1997 | Ono et al. |
| 6,118,568 A | 9/2000 | Fukasawa et al. |
| 6,201,624 B1 | 3/2001 | Ozaki et al. |
| 7,118,233 B2 | 10/2006 | Mori |
| 7,379,084 B2 | 5/2008 | Kobuse |
| 7,420,723 B2 | 9/2008 | Itami et al. |
| 7,586,660 B2 | 9/2009 | Itami |
| 7,602,540 B2 | 10/2009 | Masuda et al. |
| 7,679,801 B2 | 3/2010 | Itami |
| 2003/0112486 A1 | 6/2003 | Kudo |
| 2003/0160529 A1 | 8/2003 | Suzuki et al. |
| 2003/0190413 A1 | 10/2003 | Van Steenkiste et al. |
| 2004/0051771 A1 | 3/2004 | Eom et al. |
| 2004/0213488 A1 | 10/2004 | Murabe et al. |
| 2004/0263933 A1 | 12/2004 | Nakahata |
| 2005/0231054 A1 | 10/2005 | Kim |
| 2006/0039058 A1 | 2/2006 | Mori |
| 2006/0061847 A1 | 3/2006 | Itami |
| 2012/0033315 A1 | 2/2012 | Song et al. |
| 2012/0141167 A1 | 6/2012 | Chun et al. |

FOREIGN PATENT DOCUMENTS

| | | |
|---|---|---|
| JP | 2707453 | 10/1997 |
| JP | 10-90626 | 4/1998 |
| JP | 2003-177346 | 6/2003 |
| JP | 2004-345172 | 12/2004 |
| JP | 2005-352059 | 12/2005 |

FIG.7

| MATERIAL | YOUNG'S MODULUS GPa | POISSON'S RATIO | LINEAR EXPANSION COEFFICIENT ×10⁻⁶/°C | DENSITY kg/m³ |
|---|---|---|---|---|
| HIGH PURITY ALUMINUM | 67.5 | 0.355 | 24.58 | 2698 |
| POLYCARBONATE | 2.5 | 0.4 | 66 | 1200 |

OPTICAL DEFLECTOR, OPTICAL SCANNING APPARATUS, AND IMAGE FORMING APPARATUS

CROSS-REFERENCE TO RELATED APPLICATIONS

The present application is a continuation of U.S. application Ser. No. 14/503,869 filed Oct. 1, 2014, which is a continuation of U.S. patent application Ser. No. 14/246,622 filed Apr. 7, 2014 (now U.S. Pat. No. 8,896,898), which is a continuation application of and claims the benefit of priority under 35 U.S.C. §120 from U.S. application Ser. No. 13/790,921 filed Mar. 8, 2013 (now U.S. Pat. No. 8,743,445), which is a divisional application of U.S. application Ser. No. 11/613,445 filed Dec. 20, 2006 (now U.S. Pat. No. 8,416,483), which is based on Japanese Priority Application No. 2005-372744 filed Dec. 26, 2005, with the Japanese Patent Office, the entire contents of each of which is hereby incorporated by reference.

BACKGROUND OF THE INVENTION

1. Field of the Invention

The present invention relates to an optical deflector, an optical scanning apparatus, and an image forming apparatus used for, for example, forming color images.

2. Description of the Related Art

Japanese Laid-Open Patent Application No. 2-16521 discloses an example of a related art case of an optical deflector (deflecting apparatus) used in, for example, a color image forming apparatus. The deflecting apparatus includes: plural polygon mirrors for deflecting plural light beams, respectively; a connecting part formed equal to or smaller than an inscribed circle of the plural polygon mirrors for connecting the plural polygon mirrors; and a drive motor that drives rotatively. Thus, the polygon mirrors form a united body having a two level configuration with one polygon mirror on top of the other. However, since the polygon mirrors are fixed to a rotating shaft by a leaf spring member, the temperature rise and centrifugal force generated by high speed rotation of the rotating shaft causes the fixed polygon mirrors to slightly shift and change the balance of the rotated configuration. This results in the problem of vibration. Particularly, a significant vibration may be created even by a slight shift of the polygon mirrors since the mass of the polygon mirrors having the two-level configuration is heavy.

The optical deflector used in a color image forming apparatus includes a type configured to have plural laser beams incident thereto and deflect the plural incident laser beams. Therefore, this type of optical deflector either has the reflection surface of the polygon mirror formed with a large area (increasing thickness of mirror, thick mirror configuration) or has two separate mirrors spaced apart from each other in the axis direction (double mirror configuration). Meanwhile, a polygon scanner having the thick mirror configuration or the double mirror configuration is to be rotated at a high speed of 25,000 rpm or more with high precision for enabling a color image forming apparatus to achieve high speed printing and provide image quality of high definition. However, as the thick mirror configuration is rotated at high speed, windage loss created by the mirror becomes greater. As a result, the windage loss causes the electric power consumption of the motor to increase. Furthermore, with the double mirror configuration, the reference plane during the mounting of the mirrors is required to be processed (finished) with high precision. Furthermore, the optical face tangle between the two mirrors is also required to be set with high precision. Such complicated process/assembly steps lead to a problem of increased manufacturing cost of the double mirror configuration.

Furthermore, as described above, in a case where the configuration having two levels of polygon mirrors forming a united body is rotated at high speed, the temperature rise and centrifugal force generated by the high speed rotation cause the polygon mirrors to slightly shift, change the balance of the rotated configuration, and result in the problem of vibration. This is caused by the polygon mirrors being fixed to a rotating shaft by a leaf spring member. Particularly, a significant vibration may be created even by a slight shift of the polygon mirrors since the mass of the polygon mirrors having the two-level configuration is large. Furthermore, the slight shifting (balance change of the rotated configuration) and the resulting increase of vibration occurring when rotating the configuration at a high speed in a high temperature environment are caused by, for example, the different coefficients of thermal expansion of the components of the rotated configuration (polygon mirror, a flange fixing a rotary magnet, rotating shaft) or (even in a case where the coefficients of thermal expansion of the components match) tolerance and/or the method of the fixing components.

With respect to the above-described problem, Japanese Laid-Open Patent Application No. 2003-177346 (filed by applicant) discloses the below-described optical deflector for providing a polygon scanner and its processing method for achieving high speed rotation with low vibration at high temperature as well as reduction of power consumption and facilitation of assembly.

In the optical deflector disclosed in Japanese Laid-Open Patent Application No. 2003-177346, a rotary member 8 of a polygon scanner 1 includes polygon mirror reflecting surfaces 8a, 8b separated in an axial direction, a circumferential surface fixing a rotary magnet 11 of an outer rotary motor, and a circumferential surface fixing a bearing shaft 10, in which the polygon mirror reflecting surfaces 8a, 8b and the circumferential surfaces are formed of a single member. The rotary member 8 has circumferential grooves 8h, 8i, and 8k which are used as adhesive coating parts for balance correction and prevention of stress strain against the reflecting surfaces 8a, 8b that occur during shrinkage fitting of the bearing shaft 10 or in correspondence with changes of temperature of the environment. Furthermore, the polygon mirror reflecting surfaces 8a, 8b have upper and lower surfaces of a substantially center part shaped substantially as a concave or a convex part with respect to both ends of a part contributing to deflection in a main scanning direction, to thereby prevent deviation of respective colors of a color image forming apparatus.

Although the optical deflector disclosed in Japanese Laid-Open Patent Application No. 2003-177346 is able to reduce windage loss of the mirrors that have their sizes increased along with the increase in high speed rotation by forming a two level configuration by removing an intermediate part of the separated reflecting surfaces, it is difficult to increase the high speed rotation further. In addition, environmental burdens such as power consumption and noise pollution are becoming greater as the high speed rotation is further increased.

Furthermore, although the optical deflector disclosed in Japanese Laid-Open Patent Application No. 2003-177346 is provided with a polygon mirror having 5, 6, or more surfaces for increasing the number of scans per rotation and accelerating printing speed, the reflection surface is to have its width increased to some extent in order to obtain a desired scanning width for the image forming area of the light beam. This results to a problem where the size of the radius of the inscribed circle of the polygon mirrors becomes large. This leads to increase the windage loss of the mirrors.

Furthermore, due to the above-described increase in the radius of the inscribed circle of the polygon mirrors, deformation of the mirrors caused by centrifugal force becomes greater as rotational speed is increased. This results in deterioration of profile regularity. Furthermore, the starting time for the mirrors to reach a predetermined number of rotations (rpm) for scanning becomes longer the more the rotational speed is increased. This increases the amount of power consumed before reaching an actual operating state.

SUMMARY OF THE INVENTION

The present invention may provide an optical deflector, an optical scanning apparatus, and an optical deflector, that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an optical deflector, an optical scanning apparatus, and an image forming apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an optical deflector including a rotary member supported by a bearing shaft and rotatively driven by a motor for deflecting a plurality of laser beams separated from each other in a rotational axis direction of the rotary member, the optical deflector including: a polygon mirror having four sides arranged about the rotational axis direction; wherein each of the four sides is a continuous plane having a plurality of effective reflection areas separated from each other in the rotational axis direction.

In the optical deflector according to an embodiment of the present invention, the polygon mirror may be formed of a material having Young's modulus in the range 60-220 GPa.

In the optical deflector according to an embodiment of the present invention, aluminum may be a main constituent of the material of the polygon mirror.

In the optical deflector according to an embodiment of the present invention, the four sides of the polygon mirror may be reflection surfaces that are formed by surface processing a material having Young's modulus in the range 200-400 GPa.

In the optical deflector according to an embodiment of the present invention, the polygon mirror may have a center hole, wherein the ratio of the diameter of the center hole with respect to a circumscribed circle diameter is in the range 10-40%.

In the optical deflector according to an embodiment of the present invention, the four sides of the polygon mirror may be reflection surfaces that are formed by surface processing a material having Young's modulus in the range 1-10 GPa.

In the optical deflector according to an embodiment of the present invention, the polygon mirror may be fixed to the rotary member by an engagement portion formed at an outer side of the polygon mirror.

In the optical deflector according to an embodiment of the present invention, the engagement portion may be an outer ridge line part of the polygon mirror.

Furthermore, another embodiment of the present invention provides an optical scanning apparatus including an optical system for scanning a scanning line on a target scanning surface by guiding a beam of a semiconductor laser to the target scanning surface and forming a beam spot on the target scanning surface, the optical scanning apparatus including: the optical deflector according to an embodiment of the present invention for deflecting the beam to the target scanning surface.

Furthermore, another embodiment of the present invention provides an optical scanning apparatus including an optical system for scanning a plurality of scanning lines on a target scanning surface by guiding a plurality of beams of a semiconductor laser to the target scanning surface and forming a plurality of beam spots on the target scanning surface, the optical scanning apparatus including: the optical deflector according to an embodiment of the present invention for deflecting the plural beams to the target scanning surface.

Furthermore, another embodiment of the present invention provides an image forming apparatus for forming a visible image from a latent image formed on a photoconductor by scanning a light beam on a photosensitive surface of the photoconductor, the image forming apparatus including: the optical scanning apparatus according to an embodiment of the present invention.

Other objects and further features of the present invention will be apparent from the following detailed description when read in conjunction with the accompanying drawings.

BRIEF DESCRIPTION OF THE DRAWINGS

FIG. 7 is a graph showing characteristic values used in calculating deformation from centrifugal force;

DESCRIPTION OF THE PREFERRED EMBODIMENTS

Figure 1:
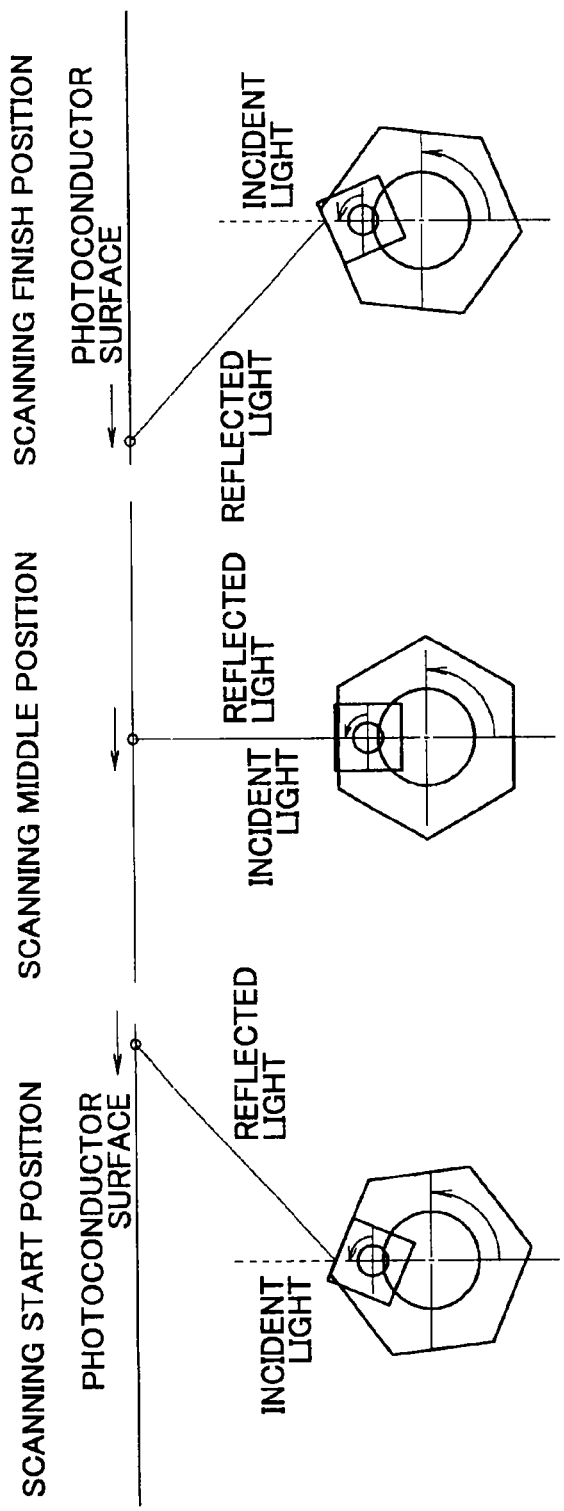
FIG. 1 is a schematic diagram for describing a laser beam scanning performed by using a six sided polygon mirror and a four sided polygon mirror.

In the following, embodiments of the present invention will be described with reference to the accompanying drawings.

First, the characteristics of an optical deflector, an optical scanning apparatus, and an image forming apparatus according to an embodiment of the present invention are described below.

The optical deflector according to an embodiment of the present invention includes a rotary member supported by a bearing shaft and rotatively driven by a motor for deflecting a plurality of laser beams separated from each other in a rotational axis direction of the rotary member. The optical deflector has a polygon mirror having four sides arranged about the rotational axis direction, wherein each of the four sides is a continuous plane having a plurality of effective reflection areas separated from each other in the rotational axis direction. Accordingly, with the optical deflector according to an embodiment of the present invention, environmental burdens from the manufacturing stage to the operating stage (e.g. consumption of material and energy) can be reduced. Furthermore, in the manufacturing stage, the material of the polygon mirror as well as the energy consumption for processing the polygon mirror can be reduced. Moreover, in the operating stage, the power consumption during the starting period of the rotary member can be reduced by shortening the starting time of the rotary member. Furthermore, in the operating stage, windage loss of the mirror, power consumption during a steady rotating state, and noise can be reduced.

In the optical deflector according to an embodiment of the present invention, the polygon mirror is formed of a material having Young's modulus in the range 60-220 GPa. Accordingly, with the optical deflector according to an embodiment of the present invention, deformation of the reflection surfaces of the polygon mirror caused by the centrifugal force can be reduced, and the polygon mirror can be easily processed.

In the optical deflector according to an embodiment of the present invention, aluminum is a main constituent of the material of the polygon mirror. Accordingly, with the optical deflector according to an embodiment of the present invention, the mass of the polygon mirror and the moment of inertia of the rotary member can be reduced. Thereby, the starting time of the rotary member can be shortened.

In the optical deflector according to an embodiment of the present invention, the four sides of the polygon mirror are reflection surfaces that are formed by surface processing a material having Young's modulus in the range 200-400 GPa. Accordingly, with the optical deflector according to an embodiment of the present invention, deformation of the reflection surfaces of the polygon mirror caused by the centrifugal force can be reduced, and the polygon mirror can be resistant to scratches. Thereby, the optical deflector according to an embodiment of the present invention can be easily recycled.

In the optical deflector according to an embodiment of the present invention, the polygon mirror has a center hole in which the ratio of the diameter of the center hole with respect to a circumscribed circle diameter is in the range 10-40%. Accordingly, with the optical deflector according to an embodiment of the present invention, deformation of the reflection surfaces of the polygon mirror caused by the centrifugal force can be reduced.

In the optical deflector according to an embodiment of the present invention, the four sides of the polygon mirror are reflection surfaces that are formed by surface processing a material having Young's modulus in the range 1-10 GPa. Accordingly, with the optical deflector according to an embodiment of the present invention, the base material of the polygon mirror can be easily processed (fabricated) by molding resin, and the mass of the polygon mirror can be reduced. Thereby, the starting time of the rotary member can be shortened.

In the optical deflector according to an embodiment of the present invention, the polygon mirror is fixed to the rotary member by an engagement portion formed at an outer side of the polygon mirror. Accordingly, with the optical deflector according to an embodiment of the present invention, the small-sized polygon mirror can easily be positioned and fixed to said position.

In the optical deflector according to an embodiment of the present invention, the engagement portion is an outer ridge line part of the polygon mirror. Accordingly, with the optical deflector according to an embodiment of the present invention, the polygon mirror requires no engagement portion dedicated for positioning the polygon mirror and fixing the polygon mirror to said position.

Furthermore, an optical scanning apparatus according to an embodiment of the present invention includes an optical system for scanning a scanning line on a target scanning surface by guiding a beam of a semiconductor laser to the target scanning surface and forming a beam spot on the target scanning surface. The optical scanning apparatus has the above-described optical deflector for deflecting the beam to the target scanning surface. Accordingly, with the optical scanning apparatus according to an embodiment of the present invention, the reflection surfaces of the polygon mirror of the optical deflector can maintain a highly precise configuration, the scanning beam can maintain constant shape, noise can be reduced, and environmental burdens from the manufacturing stage to the operating stage (e.g. consumption of material and energy) can be reduced.

Furthermore, an optical scanning apparatus according to an embodiment of the present invention includes an optical system for scanning a plurality of scanning lines on a target scanning surface by guiding a plurality of beams of a semiconductor laser to the target scanning surface and forming a plurality of beam spots on the target scanning surface. The optical scanning apparatus includes the above-described optical deflector for deflecting the plural beams to the target scanning surface. Accordingly, with the optical scanning apparatus (multi-beam optical scanning apparatus) according to an embodiment of the present invention, the reflection surfaces of the polygon mirror of the optical deflector can maintain a highly precise configuration, the scanning beams can maintain constant shape, noise can be reduced, and environmental burdens from the manufacturing stage to the operating stage (e.g. consumption of material and energy) can be reduced.

Furthermore, an image forming apparatus according to an embodiment of the present invention for forming a visible image from a latent image formed on a photoconductor by scanning a light beam on a photosensitive surface of the photoconductor includes the above-described optical scanning apparatus. Accordingly, with the image forming apparatus according to an embodiment of the present invention, the scanning beams of the optical scanning apparatus can maintain a constant shape, high quality images can be obtained, noise can be reduced, and environmental burdens from the manufacturing stage to the operating stage (e.g. consumption of material and energy) can be reduced.

Next, an optical deflector according to an embodiment of the present invention is described in further detail below.

[Comparison of Mirror Windage Loss]

In a related art case, a two-level polygon mirror having six sides and a circumscribed circle diameter (i.e. diameter of the circumscribed circle of the polygon mirror) of approximately 42 mm is used in a color image forming apparatus (e.g. an A3 size copier, a printer) for scanning a length (distance) of approximately 300 mm on a photoconductor. Instead of using the six sided polygon mirror, the optical deflector 1000 according to an embodiment of the present invention uses a polygon mirror 1001 having four sides and a circumscribed circle diameter of approximately 20 mm. Furthermore, the polygon mirror 1001 of the optical deflector 1000 according to an embodiment of the present invention has plural effective reflection areas formed on a single continuous plane thereof in a manner separated from each other in a rotational axis direction. The use of the optical deflector 1000 according to an embodiment of the present invention reduces environmental burdens (e.g. consumption of energy and material) from the manufacturing process to the operating process.

FIG. 1 is a schematic diagram for describing the use of a four sided polygon mirror instead of a six sided polygon mirror in a case of having a laser beam reflected from a polygon mirror rotating in a counter-clockwise direction and having the reflected laser beam scan a photoconductor from a right end to a left end.

The reflection surface of the six sided polygon mirror is positioned substantially at the same position as that of the four sided polygon mirror and scans the same scan width as the four sided polygon mirror. In order to match the position of the reflection surface of the six sided polygon mirror with the position of the reflection surface of the four sided polygon mirror, the rotation center of the six sided polygon mirror is situated at a position different from the rotation center of the four sided polygon mirror. The size required for scanning the same width is significantly different between the six sided polygon mirror and the four sided polygon mirror. That is, the four sided polygon mirror can be formed in an extremely small size compared to the six sided polygon mirror even where the scanning width is the same.

As shown in FIG. 1, in a case of scanning a laser beam from a right end to a left end of a photoconductor, a laser beam reflection position moves from a left end to a right end of the polygon mirror. The movement of the laser beam reflection position on the polygon mirror is greater for the six sided polygon mirror than that of the four sided polygon mirror. That is, the six sided polygon mirror has a wider reflection surface than that of the four sided polygon mirror. Since the distance between the rotation center and the reflection surface is smaller for the four sided polygon mirror than the six sided polygon mirror, the movement of the six sided polygon mirror becomes greater than that of the four sided polygon mirror with respect to the same amount of change in the rotation angle.

Figure 2:
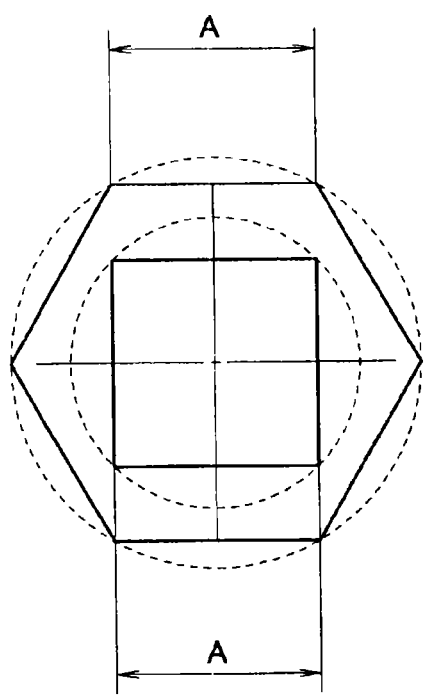
FIG. 2 is a schematic diagram showing a six sided polygon mirror and a four sided polygon mirror having equal reflection surface width A.

FIG. 2 is a schematic view showing a six sided polygon mirror and a four sided polygon mirror superposed on each other where the six sided polygon mirror and the four sided polygon mirror have a reflection surface of equal width (hereinafter referred to as "reflection surface width A"). FIG. 2 shows that the diameter of the circumscribed circle of the four sided polygon mirror (i.e. circumscribed circle diameter) is smaller than that of the six sided polygon mirror. Since the distance between the rotation center and the reflection surface can be shortened for the four sided polygon mirror, it is possible to further reduce the reflection surface of the four sided polygon mirror.

The six sided polygon mirror can be replaced with the four sided polygon mirror by using an optical layout design where, for example, the six sided polygon mirror having a circumscribed circle diameter of approximately 42 mm is replaced with a four sided polygon mirror having a circumscribed circle diameter of approximately 20 mm. In a case of replacing the six sided polygon mirror with the four sided polygon mirror, the rotation speed along the circumference of circumscribed circle can be reduced to 0.48 (20/42) times since the rotation speed reduction of the four sided polygon mirror is in proportion to the circumscribed circle diameter of the six sided polygon mirror and the four sided polygon mirror. However, in order to obtain the same scanning speed as the six sided polygon mirror, the four sided polygon mirror is to be rotated at a rotation speed of 1.5 (6/4) times. Therefore, in a case of replacing the six sided polygon mirror with the four sided polygon mirror, the rotation speed along the circumference of the circumscribed circle of the four sided polygon mirror is reduced to 0.72 times (0.48× 1.5).

Since air resistance is typically in proportion to the second power of rotation speed, the air resistance along the circumscribed circle of the four sided polygon mirror is reduced 0.52 times with respect to the six sided polygon mirror. Since the angle of the surface facing the wind is different between the six sided polygon mirror and the four sided polygon mirror, the amount of air resistance that is reduced may become slightly less. Nevertheless, the four sided polygon mirror is advantageous compared to the six sided polygon mirror in a case of obtaining the same scanning speed. This advantage in the reduction of air resistance is most effective for an optical deflector that deflects plural laser beams separated from each other in a rotational axis direction.

As shown in the above-described Japanese Laid-Open Application No. 2003-177346, the optical deflector of the related art has a two-level six sided polygon mirror for deflecting plural laser beams separated from each other in a rotational axis direction. With this configuration, however, air resistance during the rotation of the six sided polygon mirror becomes extremely large. Therefore, an intermediate part between its plural reflection surfaces separated from each other in the rotational axis direction is cut out (machined) so as to reduce air resistance. Hence, the six sided polygon mirror of the related art requires a step of cutting off the intermediate part and also requires a large amount of material to be consumed. Furthermore, the six sided polygon mirror requires performing a step of finishing (processing) on six sides so as to form six mirror surfaces. As a result, environmental burdens are large in the manufacturing stage (e.g. consumption of energy and material). In addition, energy consumption and noise created by the mirrors against the air also are large when the six sided polygon mirror is in an operating state (operation stage). Furthermore, the more the six sided polygon mirror is rotated at higher speed, the longer becomes the starting time for the six sided polygon mirror to reach a number of rotations (rpm) for scanning (scanning rotations). Therefore, electric power consumed when starting the optical deflector having the six sided polygon mirror becomes large.

Figure 9A:
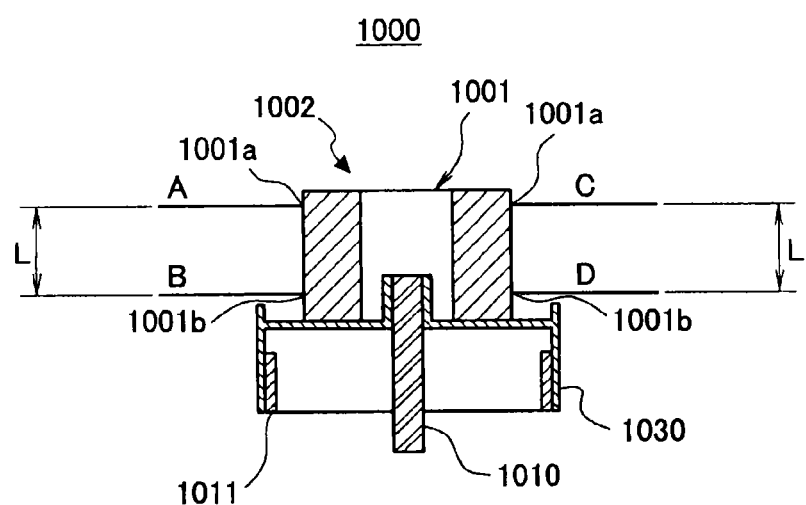
FIG. 9A is a vertical cross-sectional view showing an optical deflector according to an embodiment of the present invention.
Figure 9B:
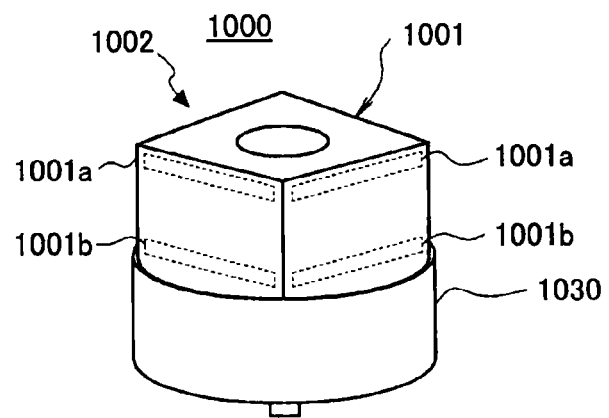
FIG. 9B is a perspective view showing an optical deflector according to an embodiment of the present invention.

The optical deflector 1000 according to an embodiment of the present invention is a four sided polygon mirror 1001 in which each side of the four sided polygon mirror is a continuous plane having plural effective reflecting areas 1001a, 1001b separated in a rotational axis direction (See FIG. 9A, 9B). By forming the optical deflector 1000 with such a configuration, the following advantages can be obtained.

As described above, with the four sided configuration of the polygon mirror 1001, the amount of air resistance during rotation of the polygon mirror 1001 can be reduced considerably. Therefore, unlike the six sided polygon mirror, there is no need to cut out an intermediate part between its plural reflection surfaces separated in the rotational axis direction. Furthermore, since the polygon mirror 1001 according to an embodiment of the present invention can be formed in an extremely small size, the amount of material used in forming the polygon mirror 1001 can be reduced. Furthermore, the step of processing the mirror surfaces is required to be performed only on four sides rather than on six sides. Furthermore, the area for processing each mirror surface on each side of the four sided polygon mirror 1001 is smaller than the area for processing each mirror surface on each side of the six sided polygon mirror. As a result, the four sided configuration of the polygon mirror 1001 can reduce environmental burdens (e.g. consumption of energy and material) during the stage of manufacturing the optical deflector 1000. Furthermore, the four sided configuration of the polygon mirror 1001 can also reduce consumption of electric power and noise created by mirrors moving against the air during the stage of operating the optical deflector 1000. Furthermore, since the polygon mirror 1001 is formed in a small size and the moment of inertia of the rotary member 1002 including the polygon mirror 1001 is small, the starting time for the polygon mirror 1001 to reach a predetermined number of rotations (rotational speed) for performing the scanning can be shortened. Thereby, the electric power consumed when starting the optical deflector 1000 can be reduced.

[Comparison of Deformation of Polygon Mirror Due to Centrifugal Force]

Figure 3:
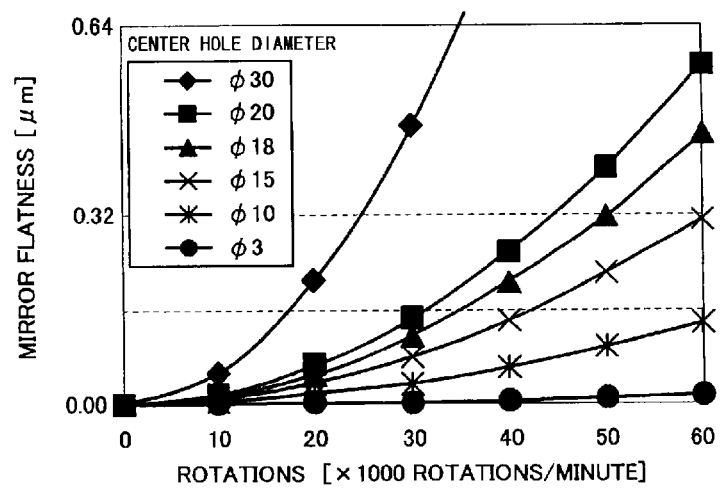
FIG. 3 is a graph showing the flatness of a six sided polygon mirror having a circumscribed circle diameter of approximately 42 mm (material: high purity aluminum)

FIG. 3 is a graph showing the results obtained by calculating deformation due to centrifugal force (centrifugal force deformation) with respect to an optical deflector having a six sided polygon mirror according to a comparative example. The six sided polygon mirror of the comparative example has a circumscribed circle diameter of approximately 42 mm and is formed of high purity aluminum. When the six sided polygon mirror is rotated at high speed, a center part of its mirror surface protrudes further outside than both ends, such that the mirror surface deforms into a convex shape. Thus, the flatness of the mirror is deteriorated. The amount of deformation is influenced by the diameter of the center hole of the polygon mirror. That is, the mirror deformation from high speed rotation becomes greater the larger the center hole is, and becomes less the smaller the center hole is. Normally, in a case of a six sided polygon mirror, a flatness of 0.32 μm or less is required (in a case of a high precision six sided polygon mirror, a flatness of 0.16 μm or less is required).

Figure 4:
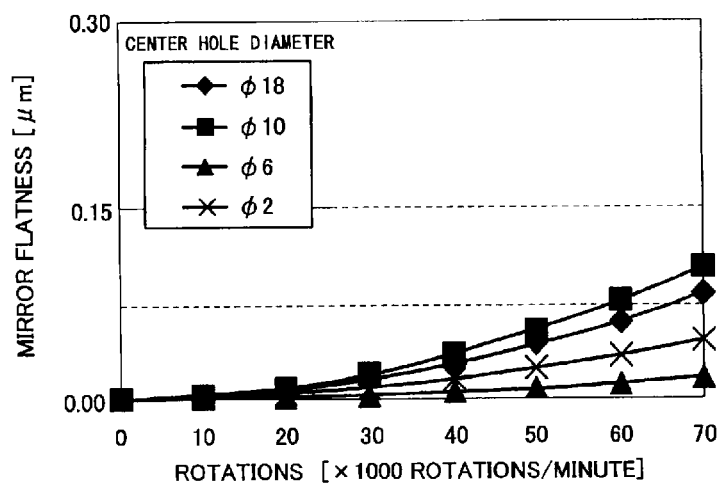
FIG. 4 is a graph showing the flatness of a four sided polygon mirror having a circumscribed circle diameter of approximately 20 mm (material: high purity aluminum)

FIG. 4 is a graph showing the results obtained by calculating deformation due to centrifugal force (centrifugal force deformation) with respect to an optical deflector 1000 having a four sided polygon mirror 1001 according to an embodiment of the present invention. The four sided polygon mirror 1001 according to an embodiment of the present invention has a circumscribed circle diameter of approximately 20 mm and is formed of high purity aluminum. When the four sided polygon mirror 1001 is rotated at high speed, a center part of its mirror surface protrudes further outside than both ends, such that the mirror surface deforms into a convex shape. Thus, the flatness of the mirror is deteriorated. Although the amount of deformation is influenced by the diameter of the center hole of the polygon mirror 1001, the influence of the diameter of the center hole is less compared to that of the six sided polygon mirror shown in FIG. 3. Normally, in a case of a four sided polygon mirror, a flatness of 0.15 μm or less is required (in a case of a high precision four sided polygon mirror, a flatness of 0.08 μm or less is required).

In comparing the centrifugal force deformation of the polygon mirrors by referring to FIGS. 3 and 4, the absolute value of the amount of deformation of the four sided polygon mirror 1001 is smaller than that of the six sided polygon mirror. That is, the four sided polygon mirror 1001 is more effective against centrifugal force deformation. Furthermore, since the four sided polygon mirror 1001 is less influenced by the diameter of its center hole, the degree of freedom in designing the diameter of the center hole of the four sided polygon mirror 1001 is higher than that of the six sided polygon mirror.

Figure 5:
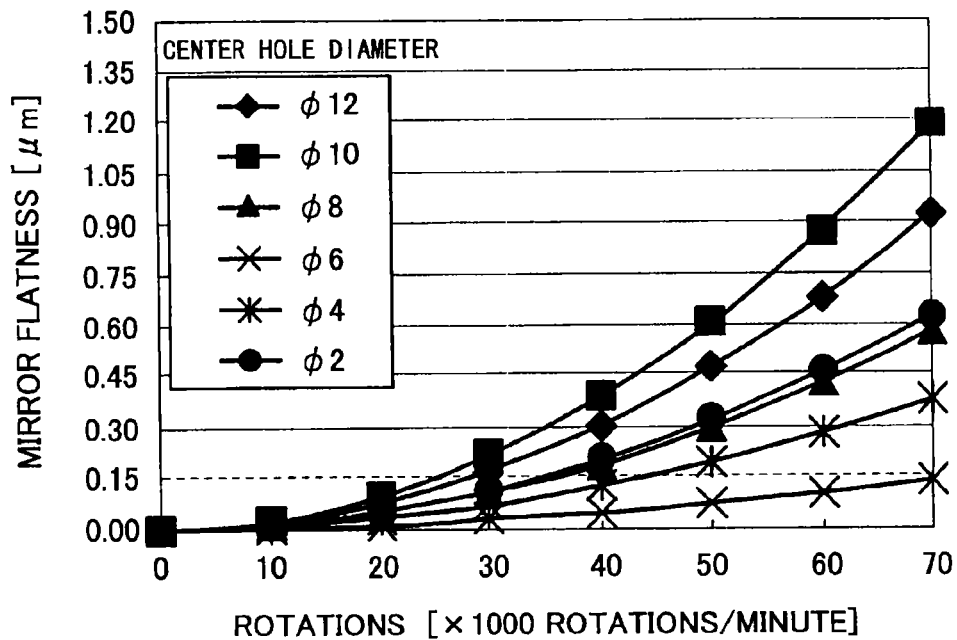
FIG. 5 is a graph showing the flatness of a four sided polygon mirror having a circumscribed circle diameter of approximately 20 mm (material: polycarbonate)
Figure 6:
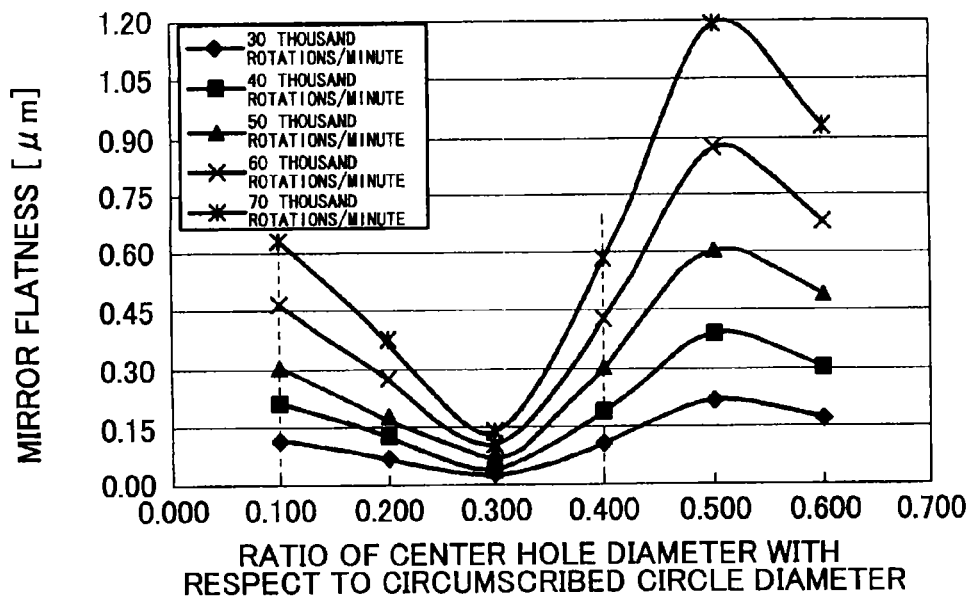
FIG. 6 is a graph showing deformation from centrifugal force for a four sided polygon mirror having a circumscribed circle diameter of approximately 20 mm (material: polycarbonate)

FIG. 5 is a graph showing the results obtained by calculating deformation due to centrifugal force (centrifugal force deformation) with respect to an optical deflector 1000 having a four sided polygon mirror 1001 according to another embodiment of the present invention. The four sided polygon mirror 1001 according to this embodiment of the present invention has a circumscribed circle diameter of approximately 20 mm and is formed of polycarbonate. FIG. 6 is a graph showing mirror flatness in a case where the horizontal axis represents the ratio of the center hole diameter with respect to the circumscribed circle diameter based on the data shown in FIG. 5.

In comparing FIGS. 4 and 5, the centrifugal force deformation of the four sided polygon mirror 1001 formed of polycarbonate is approximately 10 times compared to that of the four sided polygon mirror 1001 formed of aluminum. As shown in FIG. 7, this difference is due to Young's modulus and density of each of the four sided polygon mirrors.

Although a flatness of 0.15 μm is normally required for a four sided polygon mirror, it is preferred that the ratio of the center hole diameter with respect to the circumscribed circle diameter is 10%-40% so as to reduce centrifugal force deformation as shown in FIG. 6. Furthermore, the centrifugal force deformation can be minimized by setting the ratio around an optimum value of 30%. In a case of using a resin material such as polycarbonate as the base material of the polygon material where Young's modulus of a typical resin material is 1-10 GPa (Giga Pascals), it preferable for the ratio of the center hole diameter to be 10-40%. Furthermore, the centrifugal force deformation can be minimized by setting the ratio of the center hole diameter around an optimum value of 30%. The reflection surface of the polygon mirror is formed by surface processing in a case where a resin material such as polycarbonate is used as the base material of the polygon mirror. Accordingly, the base material of the polygon mirror can be easily fabricated by molding resin material. Thereby, a polygon mirror having little mass can be obtained. As a result, the starting time of the optical deflector 1000 having the four sided polygon mirror 1001 can be shortened.

It is to be noted that the tendency illustrated in FIG. 6 is not limited to polycarbonate. In addition to aluminum, a material having Young's modulus greater than that of aluminum also exhibits the same tendency (although there is some difference in the amount of deformation). In other words, regardless of material, the ratio of the center hole diameter with respect to circumscribed circle diameter of the polygon mirror 1001 is preferred to be in the range 10-40%.

In a case of using a metal material (e.g. aluminum) for forming the polygon mirror 1001, the polygon mirror 1001 may be formed directly, for example, by performing a cutting process or a grinding process. Considering the fact that Young's modulus of a typical metal material is in the range 60-220 GPa and that a metal material with high Young's modulus has a large density, there may be a case where the effect of high Young's modulus is cancelled out. Nevertheless, the metal material can attain a centrifugal force deformation that is substantially the same level as that of high purity aluminum.

As another example of the material of the polygon mirror 1001, a ceramic material having Young's modulus greater than aluminum may be used. Since the ceramic material has Young's modulus of 200-400 GPa, the absolute amount of deformation can be reduced. This increases the degree of freedom in designing the center hole of the polygon mirror 1001. In the case where ceramic material is used as the base material of the polygon mirror 1001, the reflection surface of the polygon mirror 1001 is formed by surface processing. In such case, since the base material has extremely high hardness, the reflection surface is resistant to scratches. This makes the optical deflector 1000 suitable for recycling.

[Optical Deflector]

Figure 8:
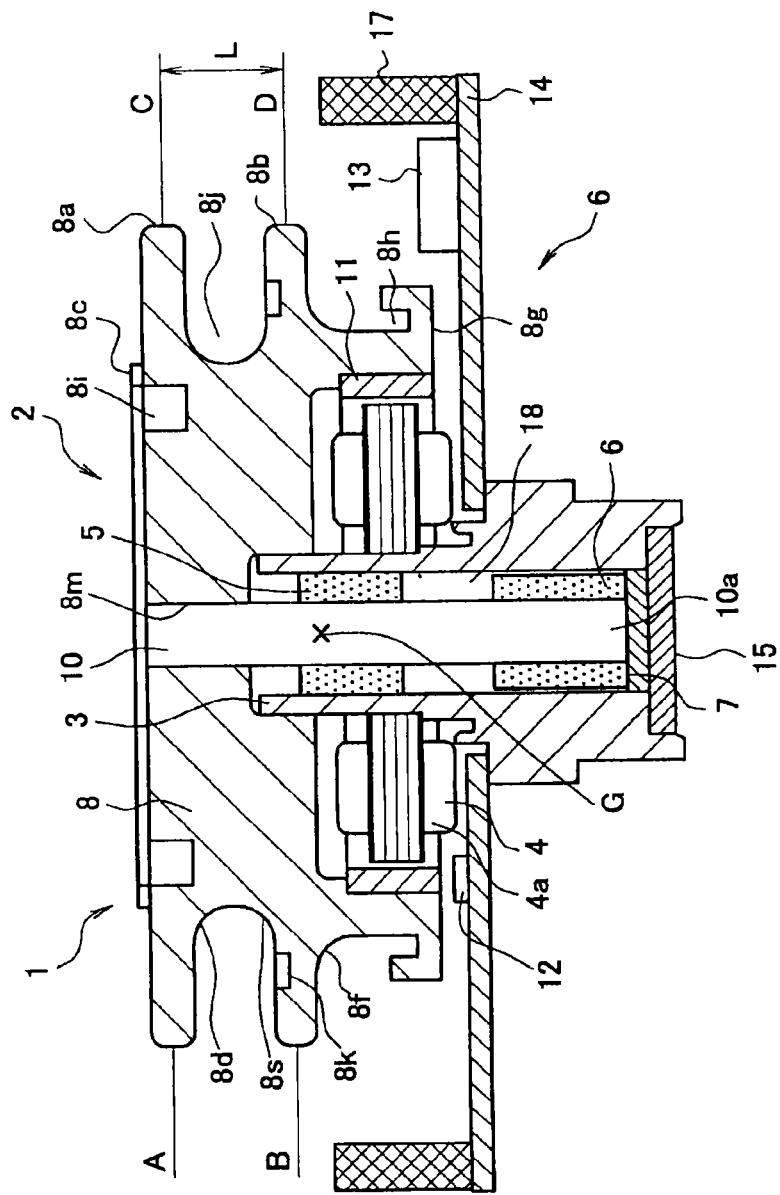
FIG. 8 is a vertical cross-sectional view showing an optical deflector according to a related art.

FIG. 8 is a schematic diagram showing an optical deflector 1 used in a color image forming apparatus according to a related art case (same as FIG. 1 in Japanese Laid-Open Patent No. 2003-177346). The difference between the optical deflector 1000 according to an embodiment of the present invention and the optical deflector 1 of the related art case shown in FIG. 8 is mainly the configuration of the polygon mirror of the rotary member. Therefore, the configuration of the rotary member 1002 according to an embodiment of the present invention is described below.

FIG. 9A is a cross-sectional view showing an optical deflector (polygon scanner) 1000 including a rotary member 1002 having a polygon mirror 1001 according to an embodiment of the present invention. FIG. 9B is a perspective view showing the optical deflector (polygon scanner) 1000 including the rotary member 1002 having the polygon mirror 1001 according to an embodiment of the present invention. The polygon mirror 1001 has four polygon mirror reflection surfaces arranged about a rotational axis direction of the rotary member 1002 in which each polygon mirror reflection surface has effective reflection areas 1001*a*, 1001*b* separated from each other in the rotational axis direction of the rotary member 1002. Plural laser beams A, B, C, and D (each laser beam corresponding to a predetermined color) are incident on respective four reflection surfaces being axially opposite to each other. The incident laser beams A, B, C, and D are deflected by the effective reflection areas 1*a*, 1*b* of the four reflection surfaces to thereby scan, for example, a photoconductor, at high speed.

The rotary member 1002 of the polygon scanner 1000 includes, for example, a bearing shaft 1010 formed of a martensitic stainless steel, a flange 1030 fixed to the bearing shaft 1010 by shrinkage fit, and the polygon mirror 1001 fixed to the flange 1030. The polygon mirror 1001 has four sides (four reflection surfaces) with respect to the rotation direction, in which each side includes the effective reflection areas 1*a*, 1*b*. A rotor magnet 1011 is fixed to an inner surface of a lower part of the flange 1030. The rotor magnet 1011, together with a stator core (not shown), form an outer rotor type brushless motor. For example, a martensitic stainless steel (e.g. SUS420J2) is a material suitable for the bearing shaft 1010 since it can be hardened and have its surface hardness increased, and also since it has satisfactory wear resistance.

Each reflection surface of the polygon mirror includes the effective reflection areas 1001*a*, 1001*b* and a middle area which is not used for deflecting laser beams incident on the reflection surface. The effective reflection areas 1001*a*, 1001*b*, and the middle area included in the reflection surface are formed on a single continuous plane. It is to be noted that the distance between the upper and lower laser beam L is decided according to the vertical space of the f θ lens through which the laser beams are transmitted after being deflected.

As described above, with the four sided configuration of the polygon mirror 1001, the amount of air resistance during rotation of the polygon mirror 1001 can be reduced considerably. Therefore, unlike the six sided polygon mirror, there is no need to cut out an intermediate part between its plural reflection surfaces separated in the rotational axis direction. Furthermore, since the polygon mirror 1001 according to an embodiment of the present invention can be formed in an extremely small size, the amount of material used in forming the polygon mirror 1001 can be reduced. Furthermore, the step of processing the mirror surfaces is required to be performed only on four sides rather than on six sides. Furthermore, the area for processing each mirror surface on each side of the four sided polygon mirror 1001 is smaller than the area for processing each mirror surface on each side of the six sided polygon mirror. As a result, the four sided configuration of the polygon mirror 1001 can reduce environmental burdens (e.g. consumption of energy and material) during the stage of manufacturing the optical deflector 1000. Furthermore, the four sided configuration of the polygon mirror 1001 can also reduce consumption of electric power and noise created by mirrors against the air flow during the stage of operating the optical deflector 1000. Furthermore, since the polygon mirror 1001 is formed in a small size and the moment of inertia of the rotary member 1002 including the polygon mirror 1001 is small, the starting time for the polygon mirror 1001 to reach a predetermined number of rotations (rotational speed) for performing the scanning can be shortened. Thereby, the electric power consumed when starting the optical deflector 1000 can be reduced.

As shown in FIGS. 9A and 9B, the polygon mirror 1001 is fixed to the flange 1003 in a manner in which an inner circumferential portion of the flange 1030 is engaged to each ridge line part (outer ridge line part) between two of the four reflection surfaces of the polygon mirror 1001. In order to reduce the inconsistency of the reflection surfaces, the ridge line part of the highly precisely formed polygon mirror 1001 is used as an engagement part. Accordingly, the optical deflector 1000 requires no engagement part dedicated for engaging the polygon mirror 1001 to the flange 1003. Thus, the small-sized polygon mirror 1001 can be easily positioned and fixed.

[Optical Scanning Apparatus]

Figure 10:
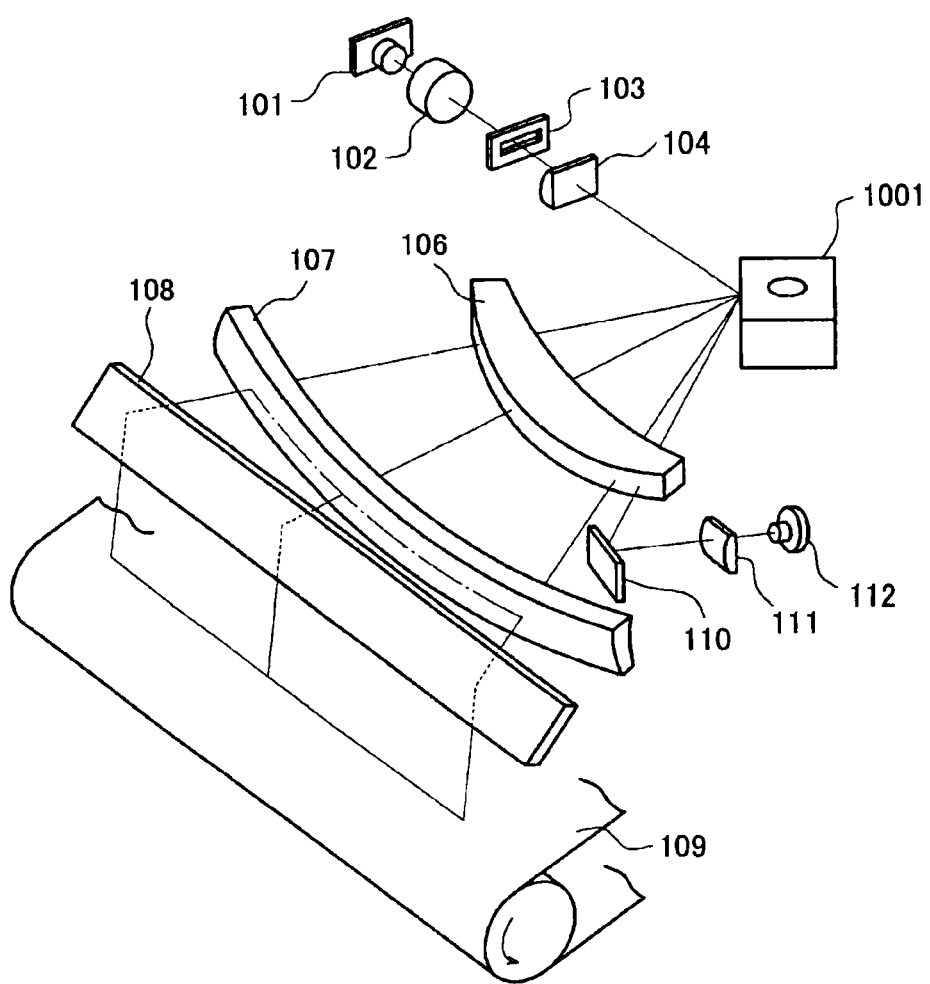
FIG. 10 is a perspective view showing a configuration of an optical scanning apparatus according to an embodiment of the present invention.

Next, an optical scanning apparatus 2000 according to an embodiment of the present invention is described. FIG. 10 is a schematic diagram showing a main part of an optical scanning apparatus 2000 including the polygon mirror 1001 of the optical deflector 1000 according to an embodiment of the present invention. The optical scanning apparatus 2000 in this embodiment of the present invention is a single beam type scanning apparatus. Although four of these optical scanning apparatuses 2000 are used for a tandem type color image forming apparatus, FIG. 10 shows a single optical scanning apparatus 2000 for the sake of convenience.

The optical scanning apparatus 2000 includes a light source 101, a coupling lens 102, an aperture 103, a cylindrical lens 104, the polygon mirror 1001, lenses 106, 107, a mirror 108, a photoconductor 109, a mirror 110, a lens 111, and a light receiving element 112.

The light source 101 includes a semiconductor laser device that emits light for performing optical scanning. The coupling lens 102 is for adjusting the light emitted from the light source 101 in correspondence to subsequent optical systems. The aperture 103 is for forming the light beam into a predetermined shape for performing optical scanning. The cylindrical lens 104 is for condensing an incident light beam(s) in a sub-scanning direction. The polygon mirror 1001 included in the optical deflector 1000 deflects incident beams with its reflection surfaces. The lenses 106, 107 are for imaging the light beams onto the photoconductor 109. The mirror 108 is for bending (deflecting) the optical paths of the light beams and guiding the light beams to the photoconductor 109. The photoconductor 109 forms an electrostatic latent image in accordance with the light beams irradiated thereto. The mirror 110 and the lens 111 condense the light beams onto the light receiving element 112. The light receiving element 112 is a photo-detection device such as a photodiode.

The light beam emitted from the light source (semiconductor laser device) 101 includes a divergent pencil of rays that are coupled to subsequent optical systems by the coupling lens 102. The shape of the coupled beam differs depending on the optical characteristic of the subsequent optical system. For example, the coupled beam may be, for example, a pencil of rays having weak divergence, a pencil of rays having weak convergence, or a pencil of rays that are parallel. When the beam transmitted through the coupling lens 102 passes through an opening part of the aperture 103, the peripheral parts of the pencil of rays with weak light intensity are blocked so that the coupled beam is transformed into a predetermined shape. Then, the beam is incident on the cylindrical lens 104 which is a linear imaging optical system. The cylindrical lens 104, which is shaped substantially as a semicircular cylinder, directs rays without power (not oriented for refraction) in a main scanning direction, condenses incident rays with positive power in a sub-scanning direction, and directs the condensed light to the vicinity of the reflection surfaces of the polygon mirror 1001 of the optical deflector 1000.

Along with the rotation of the polygon mirror rotated at a constant velocity, the beam reflected by the reflection surfaces of the polygon mirror 1001 is deflected at a constant angular velocity while being transmitted through two lenses 106, 107 that serve as a scanning optical system. The optical path of the transmitted beam is bent by the bending mirror 108 and condensed as a beam spot onto a target scanning surface of the photoconductor 109 so as to scan the target scanning surface. Before the beam scans the photoconductor 109, the beam is incident on the mirror 110 and condensed to the light receiving element 112 by the lens 111. The timing for writing on the photoconductor 109 is determined by a control part (not shown) in accordance with the output of the light receiving element 112.

Hence, the optical deflector 1000 according to this embodiment of the present invention can be used in a single beam type optical scanning apparatus 2000. With the single beam type optical scanning apparatus 2000 using the optical deflector 1000 according to an embodiment of the present invention, the scanning beam can maintain a constant shape, noise can be reduced, and environmental burdens from the manufacturing stage to the operating stage (e.g. consumption of material and energy) can be reduced owing to the highly precise configuration of the reflection surfaces of the polygon mirror 1001 of the optical deflector 1000.

[Multi-Beam Optical Scanning Apparatus]

Figure 11:
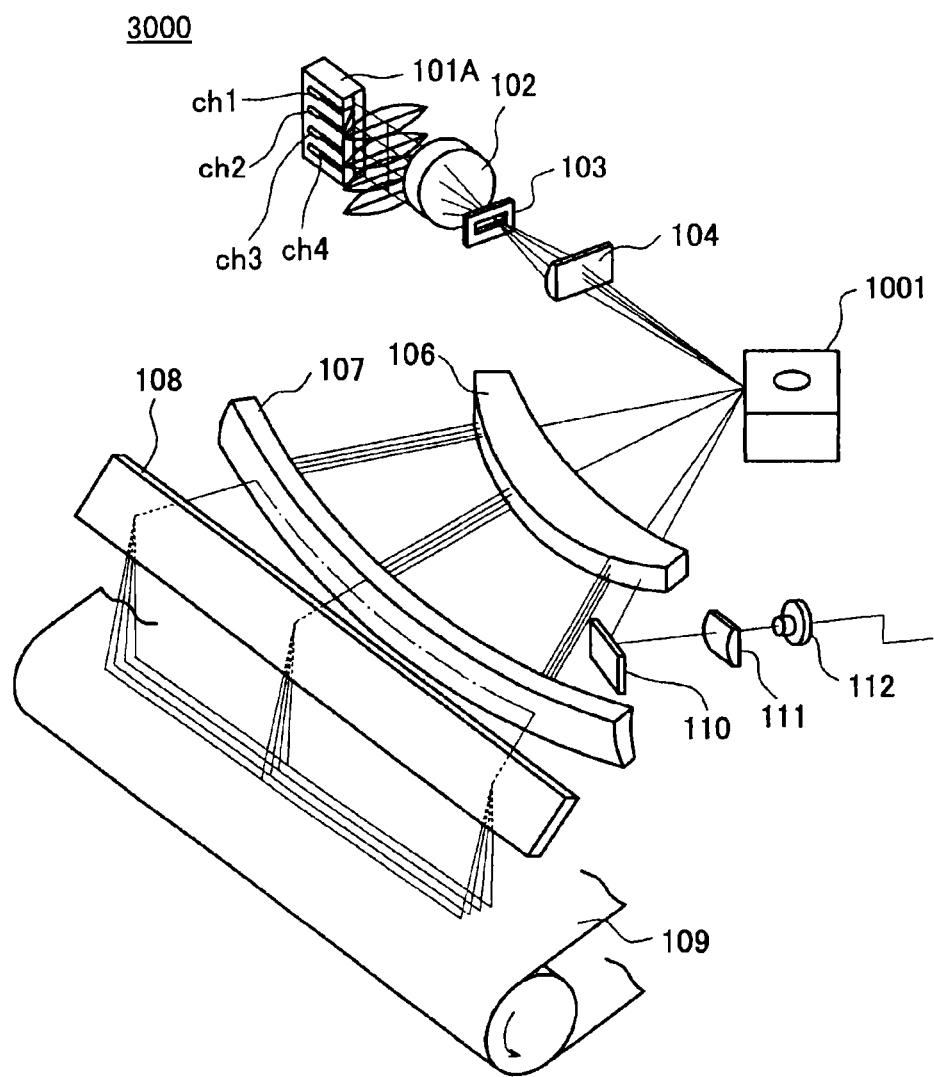
FIG. 11 is a perspective view showing a configuration of a multi-beam optical scanning apparatus according to an embodiment of the present invention.

FIG. 11 is a schematic diagram showing a main part of an optical scanning apparatus 3000 including the polygon mirror 1001 of the optical deflector 1000 according to another embodiment of the present invention. The optical scanning apparatus 3000 in this embodiment of the present invention is a multi-beam type scanning apparatus. Although four of these optical scanning apparatuses 3000 are used for a tandem type color image forming apparatus, FIG. 11 shows a single optical scanning apparatus 3000 for the sake of convenience. In FIG. 11, like components are denoted by like reference numerals as of FIG. 10 and are not further explained.

A light source 101A is a semiconductor laser array having four light sources ch1-ch4 that are evenly spaced in a single row. Although the four light sources ch1-ch4 according to this embodiment of the present invention are arranged in a sub-scanning direction, the semiconductor laser array 101A may be tilted so that the light sources ch1-ch4 are arranged in a main scanning direction.

The four beams emitted from the four light sources ch1-ch4 include a divergent pencil of rays having the major axes of their elliptic far field patterns oriented in the main scanning direction. The four beams are coupled to subsequent optical systems by the coupling lens (shared coupling lens) 102. The shape of the coupled beams differs depending on the optical characteristic of the subsequent optical systems. For example, the coupled beams may be a pencil of rays having weak divergence, a pencil of rays having weak convergence, or a pencil of rays that are parallel.

The four beams transmitted through the coupling lens 102 are transformed into a predetermined shape by the aperture 103. Then, each of the beams is converged in a sub-scanning direction by the cylindrical lens (shared linear imaging optical system) 104. Then, the four beams converged in the sub-scanning direction are separated from each other in the sub-scanning direction and respectively imaged as a long linear image in the main scanning direction at the vicinity of the reflection surfaces of the polygon mirror.

The four beams deflected at a constant angular velocity by the reflection surfaces of the polygon mirror 1001 are transmitted through the two lenses (scanning optical system) 106, 107 and have their optical paths bent by the bending mirror 108. The four beams, having their optical paths bent by the bending mirror 108, are condensed as four beam spots separated in the sub-scanning direction onto the target scanning surface of the photoconductor 109 so as to simultaneously scan the target scanning surface as four scanning lines.

Before scanning the photoconductor 109, each of the beams is incident on the mirror 110 and condensed to the light receiving element 112 by the lens 111. The timing for writing on the photoconductor 109 with the four beams is determined by a control part (not shown) in accordance with the output of the light receiving element 112.

The scanning optical system according to this embodiment of the present invention is for simultaneously condensing the four beams deflected by the polygon mirror 1001 (optical deflector 1000) in the form of four beam spots onto the target scanning surface of the photoconductor 109. The scanning optical system includes two lenses 106, 107.

Hence, the optical deflector 1000 according to this embodiment of the present invention can be used in a multi-beam type optical scanning apparatus 3000. With the multi-beam type optical scanning apparatus 3000 using the optical deflector 1000 according to this embodiment of the present invention, the scanning beams can maintain constant shape, noise can be reduced, and environmental burdens from the manufacturing stage to the operating stage (e.g. consumption of material and energy) can be reduced owing to the highly precise configuration of the reflection surfaces of the polygon mirror 1001 of the optical deflector 1000.

[Image Forming Apparatus]

Figure 12:
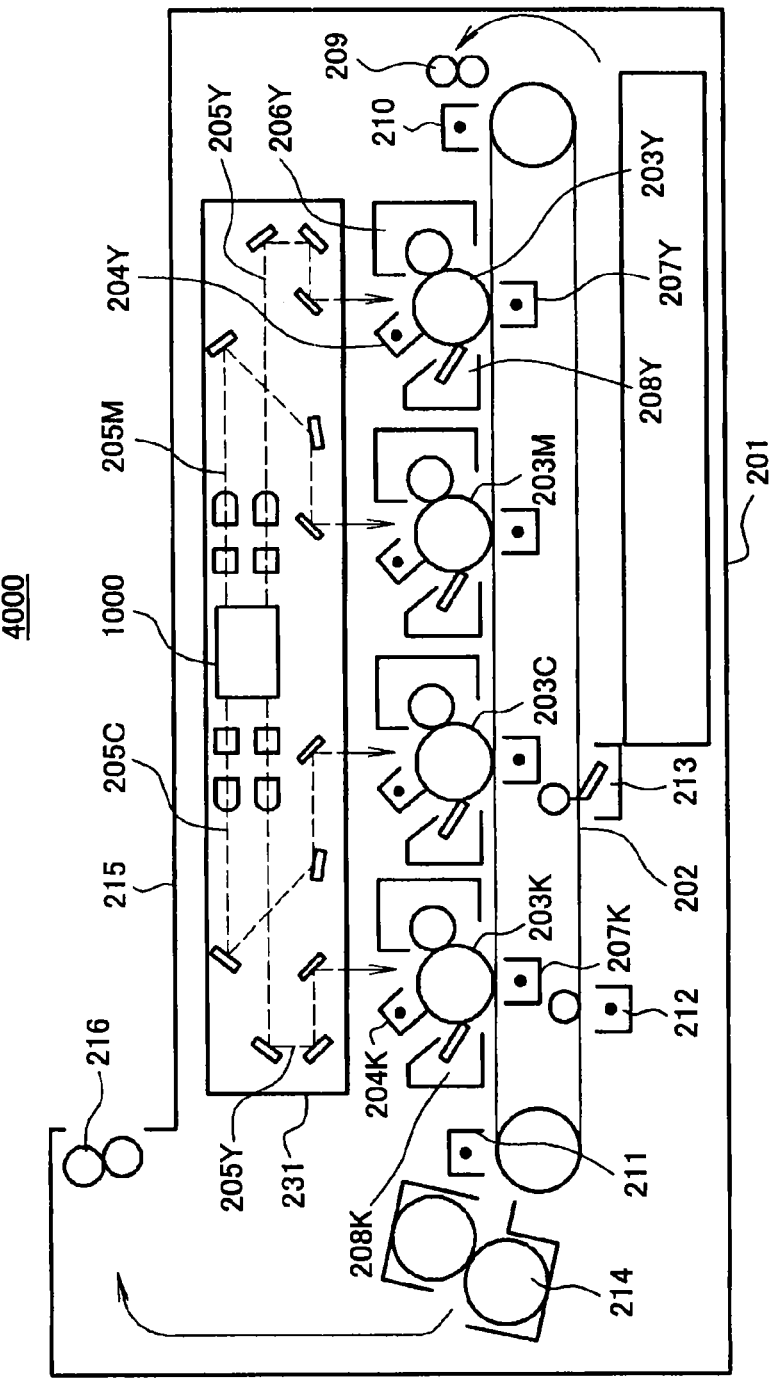
FIG. 12 is a cross-sectional view showing a configuration of an image forming apparatus (tandem type full color laser printer) according to an embodiment of the present invention.

Next, an image forming apparatus 4000 according to an embodiment of the present invention is described. FIG. 12 is a schematic diagram showing an exemplary configuration of a tandem type full color laser printer (image forming apparatus) 4000 including the optical deflector 1000 according to an embodiment of the present invention.

A conveyor belt 202 for conveying a transfer sheet (not shown) fed from a sheet feeding cassette 201 is provided in a horizontal position at a lower part of the image forming apparatus 4000. A photoconductor 203Y for yellow (Y), a photoconductor 203M for magenta (M), a photoconductor 203C for cyan (C), and a photoconductor for black (K) are arranged at equal intervals on the conveyor belt 202 in this order from an upstream side of the conveyor belt 202. It is to be noted that the letters Y, M, C, and K are added to reference numerals where colors are to be distinguished.

The photoconductors 203Y, 203M, 203C, and 203K are formed with the same diameter. Each of the photoconductors 203Y, 203M, 203C, and 203K is surrounded by components arranged in an order corresponding to an electrophotographic process.

For example, the photoconductor 203Y is surrounding by a charger (electrified body) 204Y, an optical scanning apparatus 205Y, a developing apparatus 206Y, a transferring charger 207Y, and a cleaning apparatus 208Y. In other words, the target irradiation surfaces (target scanning surfaces) of the photoconductors 203Y, 203M, 203C, and 203K are provided in a one on one relationship with respect to the optical scanning apparatuses 205Y, 205M, 205C, and 205K.

Furthermore, in the periphery of the conveyor belt 202, resist rollers 209 and a belt charger 210 are provided at a position upstream with respect to the photoconductor 205Y. Moreover, a belt separating charger, static eliminating charger 212, and a cleaning apparatus 213 are provided at a position downstream with respect to the photoconductor 205K.

Furthermore, a fixing apparatus 214 is provided downstream of the conveying direction with respect to the belt separating charger 211. The fixing apparatus 214 is connected to a sheet discharge tray 215 via sheet discharge rollers 216.

In a case of forming an image(s) in a full color mode (multi-color mode) with the above-described configuration, an electrostatic latent image is formed on each of the photoconductors 203Y, 203M, 203C, and 203K by scanning a light beam from the corresponding one of the optical scanning apparatuses 205Y, 205M, 205C, and 205K based on image signals of the corresponding one of the colors Y, M, C, and K. These electrostatic latent images are formed into toner images by being developed with toners of corresponding color. The toner images are orderly transferred in an overlapping manner (superposed) onto a transfer sheet being electrostatically attracted and conveyed on the conveyor belt 202. The toner images overlappingly transferred to the transfer sheet are fixed to the transfer sheet by the fixing apparatus 214. Thereby, a full color image is formed on the transfer sheet. Then, the transfer sheet is discharged to the sheet discharge tray 215 by the sheet discharging rollers 216.

In a case of forming an image(s) in a black mode (single color mode) with the above-described configuration, an electrostatic latent image is formed only on the photoconductor 203K by scanning a light beam from a single optical scanning apparatus 205K based on image signals corresponding to black (K) while the other photoconductors 203Y, 203M, 203C and corresponding components are in a non-operating state.

The electrostatic latent image is formed into a toner image by being developed with a black toner. The toner image is transferred to a transfer sheet being electrostatically attracted and conveyed on the conveyor belt 202. The toner image being transferred to the transfer sheet is fixed to the transfer sheet by the fixing apparatus 214. Thereby, a monochrome image is formed on the transfer sheet. Then, the transfer sheet is discharged to the sheet discharge tray 215 by the sheet discharging rollers 216.

Hence, the optical deflector 1000 according to this embodiment of the present invention can be used in a tandem type full color laser printer (image forming apparatus). With the tandem type full color laser printer using the optical deflector 1000 according to an embodiment of the present invention, a single optical deflector is shared by optical scanning apparatuses 205Y, 205M, 205C, and 205K. Accordingly, the scanning beam can maintain a constant shape, noise can be reduced, and environmental burdens from the manufacturing stage to the operating stage (e.g. consumption of material and energy) can be reduced.

Further, the present invention is not limited to these embodiments, but variations and modifications may be made without departing from the scope of the present invention.

What is claimed is:

1. An optical deflector for deflecting a plurality of laser beams separated from each other in a rotational axis direction of the optical deflector, the optical deflector comprising:
   a polygon mirror having multiple reflection surfaces arranged about the rotational axis direction;
   each of the multiple reflection surfaces is a plane of continuous material having a plurality of effective reflection areas separated from each other in the rotational axis direction by a non-reflective region;
   the plurality of laser beams incident on the polygon mirror are parallel, and the plurality of laser beams are perpendicular to a rotational axis of the polygon mirror;
   each of the multiple reflection surfaces includes a first effective reflection area, a second effective reflection area, and a middle area, the middle area including the non-reflective region which does not deflect any of the plurality of laser beams; and
   a distance, in which the first effective reflection area and the second effective reflection area are separated, is substantially equivalent to a distance between an upper laser beam and a lower laser beam of the plurality of laser beams.

2. The optical deflector according to claim 1, wherein the multiple reflection surfaces include four sides.

3. The optical deflector as claimed in claim 1, wherein the polygon mirror is formed of a material having a Young's modulus in a range of 60 to 220 GPa.

4. The optical deflector as claimed in claim 1, wherein the multiple reflection surfaces of the polygon mirror are formed by surface processing a material having a Young's modulus in a range of 200 to 400 GPa.

5. The optical deflector as claimed in claim 1, wherein the polygon mirror has a center hole, wherein a ratio of the diameter of the center hole with respect to a circumscribed circle diameter of the polygon mirror is in a range of 10 to 40 percent.

6. The optical deflector as claimed in claim 5, wherein the multiple reflection surfaces of the polygon mirror are formed by surface processing a material having a Young's modulus in a range of one to ten GPa.

7. The optical deflector as claimed in claim 1, wherein the optical deflector includes a rotary member supported by a bearing shaft, the polygon mirror is fixed to the rotary member at an outer ridge line part of the polygon mirror.

8. The optical deflector as claimed in claim 1, further comprising:
a rotating assembly configured to rotate the polygon mirror upon the rotational axis, the rotating assembly including a bearing shaft, and a flange configured to attach the polygon mirror to the bearing shaft, and the flange is fixed to the polygon mirror at an outer ridge line part of the polygon mirror,
wherein an outer side of the polygon mirror faces away from the rotational axis, and the outer side is parallel to the rotational axis, wherein side edges of the polygon mirror separate the multiple reflection surfaces from each other and the side edges are parallel to the rotational axis, and wherein an engagement portion formed at the outer side of the polygon mirror includes at least two of the side edges.

9. An optical scanning apparatus including an optical system for scanning a scanning line on a target scanning surface by guiding a beam of a semiconductor laser to the target scanning surface and forming a beam spot on the target scanning surface, the optical scanning apparatus comprising:
the optical deflector as claimed in claim 1 for deflecting the beam to the target scanning surface.

10. An image forming apparatus for forming a visible image from a latent image formed on a photoconductor by scanning a light beam on a photosensitive surface of the photoconductor, the image forming apparatus comprising:
the optical scanning apparatus as claimed in claim 9.

11. An optical scanning apparatus including an optical system for scanning a plurality of scanning lines on a target scanning surface by guiding a plurality of beams of a semiconductor laser to the target scanning surface and forming a plurality of beam spots on the target scanning surface, the optical scanning apparatus comprising:
the optical deflector as claimed in claim 1 for deflecting the plurality of beams to the target scanning surface.

12. An image forming apparatus for forming a visible image from a latent image formed on a photoconductor by scanning a light beam on a photosensitive surface of the photoconductor, the image forming apparatus comprising:
the optical scanning apparatus as claimed in claim 11.

13. The optical deflector as claimed in claim 1, wherein side edges of the polygon mirror separate the multiple reflection surfaces from each other and the side edges are parallel to the rotational axis.

14. The optical deflector as claimed in claim 1, further comprising:
a rotating assembly configured to rotate the polygon mirror upon the rotational axis, the rotating assembly including a bearing shaft, and a flange configured to attach the polygon mirror to the bearing shaft, and the flange is fixed to the polygon mirror at an outer ridge line part of the polygon mirror,
wherein an outer side of the polygon mirror faces away from the rotational axis, and the outer side is parallel to the rotational axis, and wherein an engagement portion includes at least two of the multiple reflection surfaces.

15. The optical deflector as claimed in claim 1, wherein a length of the polygon mirror in the rotational axis direction is shorter than a width of the sides of the polygon mirror.

16. The optical deflector as claimed in claim 1, wherein a length of the polygon mirror in the rotational axis direction is shorter than the diameter of a circumscribed circle of the polygon mirror.

17. The optical deflector as claimed in claim 1, wherein the first and second effective reflection areas are rectangular shaped and have short axes thereof in a direction parallel to the rotational axis direction.

18. The optical deflector as claimed in claim 1, wherein each of the multiple reflection surfaces is a single continuous plane of the material.

19. The optical deflector as claimed in claim 1, wherein widths, in the rotational axis direction, of the first and second effective reflection areas are shorter than a width, in the rotational axis direction, of the non-reflective region of the middle area.

* * * * *